Figure 1:
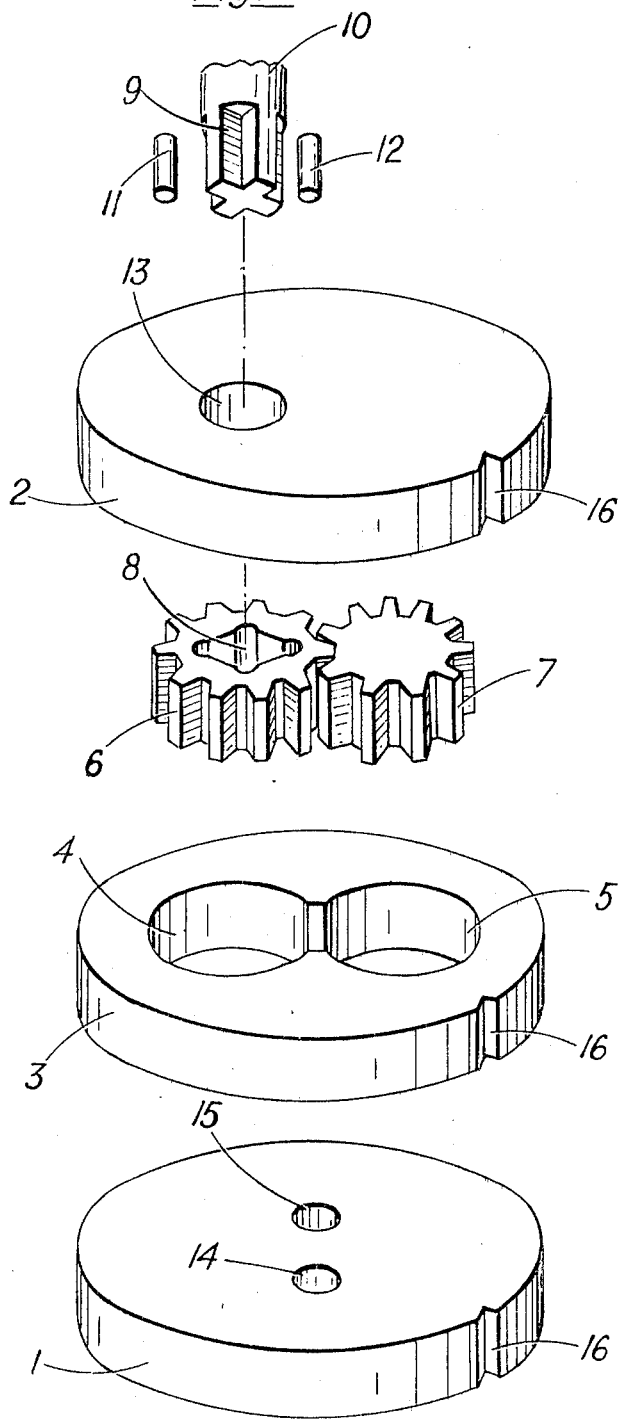

United States Patent [19]
Commarmot et al.

[11] 3,881,849
[45] May 6, 1975

[54] GEAR PUMPS

[75] Inventors: Roger Commarmot, Rhone; Michel Péquignot, Hauts de Seine, both of France

[73] Assignee: Rhone-Poulenc, S.A., Paris, France

[22] Filed: Dec. 7, 1972

[21] Appl. No.: 311,716

[30] Foreign Application Priority Data
Dec. 7, 1971 France .............. 71.43880

[52] U.S. Cl. .............. 418/182; 418/152; 418/206
[51] Int. Cl. .............................. F04c 15/00
[58] Field of Search .............. 418/206, 182

[56] References Cited
UNITED STATES PATENTS
| | | | |
|---|---|---|---|
| 1,526,356 | 2/1925 | Mallock | 418/206 X |
| 1,897,560 | 2/1933 | Lawser | 418/206 |
| 2,049,797 | 8/1936 | Bochmann et al. | 418/182 |
| 2,588,653 | 3/1952 | Nichols | 418/182 |
| 3,307,453 | 3/1967 | Nilsson et al. | 418/152 |

FOREIGN PATENTS OR APPLICATIONS
| | | | |
|---|---|---|---|
| 237,714 | 2/1962 | Australia | 418/182 |
| 548,064 | 9/1942 | United Kingdom | 418/152 |

*Primary Examiner*—C. J. Husar
*Assistant Examiner*—Leonard Smith
*Attorney, Agent, or Firm*—Stevens, Davis, Miller & Mosher

[57] ABSTRACT

A gear pump is constructed entirely of ceramic material, and includes a body having two side plates and an intermediate member, the latter being formed with two communicating part cylindrical seats in which meshing gear wheels can rotate without bearings. A drive shaft engages in a recess in one of the gear wheels, the recess being of a non-circular cross-section and the shaft engaging therein with a clearance.

2 Claims, 2 Drawing Figures

GEAR PUMPS

The present invention relates to a gear pumps.

Gear pumps are generally used for their ability to deliver a predetermined volumetric discharge and to withstand high pressures. They are very suitable especially for moving viscous fluids or lubricants. However, for reasons of lubrication, or of mechanical strength or chemical resistance, the components of gear pumps are generally constructed from different materials depending on their functions. Their possible applications are thereby restricted. Furthermore, the particular nature of these pumps imposes necessary clearances which take account of the lubrication and expansions of the various components. Because of this, they are not generally suitable as self-priming pumps or for the displacement of gas.

According to the present invention we provide a gear pump comprising a pump body formed entirely of ceramic material having inlet and outlet ports, two communicating part cylindrical seats themselves communicating with the ports, first and second meshing gear wheels, formed entirely of ceramic material located in said seats, and a drive shaft engaged in a recess of non-circular cross-section formed in the radially extending axial and face of the first gear wheel.

With such a pump one may extend the field of possible applications of gear pumps into the field of displacement of corrosive fluids, and into their use under conditions involving particularly severe variations of temperature or severe heat levels, in order to make it possible to improve their performance for sucking up liquids and in order to make it genuinely possible to use them for the displacement of gases.

Thus the two gearwheels turn freely and centre themselves of their own accord inside their seats, the ends of their teeth coming into contact with the part cylindrical walls of their seats which guide them. Such an arrangement obviously offers remarkable flexibility in operation, especially in the case of rapid variations in temperature.

In addition, the pump according to the invention possesses other advantageous characteristics. In particular, it does not require a leak-tight joint or gland or equivalent devices such as a stuffing box or mechanical packing, around the drive shaft of a gearwheel.

In effect, the drive shaft can be guided rigorously relative to the pump body, since the drive gearwheel at the shaft end is not rigidly connected to it. As a result of this, the diametral clearance between the drive shaft and the pump body can be considerably reduced, which makes it possible to establish and maintain a stable film of the fluid being conveyed, and this film is generally sufficient to ensure satisfactory leak-tightness. A suitable diametral clearance is between 2 and 10 microns.

Preferably, the pump body is made up of three components, namely two sideplates and an intermediate member, the latter having the seats for the gearwheels passing entirely therethrough and one of the sideplates containing the orifice for the drive shaft. The inlet and outlet ports for the liquid are located, in accordance with the usual rules for constructing gear pumps, on the intermediate member or on the sideplates and preferably on only one of the sideplates.

Furthermore, the pump body need not possess any gasket between its various components. Fluidtightness is achieved by the components having contact surfaces which are plane, smooth and generally polished. Fluidtightness is achieved directly by simply juxtaposing the various components of the pump body in dirct contact with one another. The pump according to the invention can thus consist exclusively of components produced from only one and the same material. Thus, they can consist of components which are made of a refractory material with a high aluminium content, such as ceramics.

Figure 2:
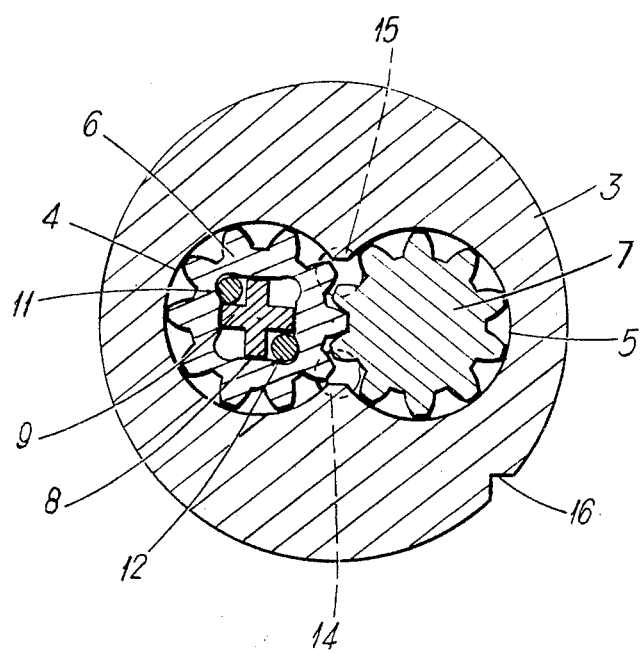

The invention will be better understood from the following description, which is given only by way of example, reference being made to the accompanying drawing in which:

FIG. 1 is the exploded view, in perspective, of the various components of one emobdiment of pump according to the invention; and FIG. 2 is a cross-sectional view of the assembled pump of FIG. 1, taken perpendicular to the axes of the gearwheels.

The pump body consists of two sideplates 1 and 2 of cylindrical shape, on either side of an intermediate member formed with two seats 4 and 5 having part cylindrical surfaces extending right through the thickness thereof, the seats accommodating the gearwheels 6 and 7. The sideplates and the intermediate member are joined together in a fluidtight manner by simply juxtaposing them in direct contact, these components being held against one another by mechanical clamping (not shown).

The gearwheels 6 and 7 are cylindrical, of the same diameter and with straight sided teeth; they engage with one another and are mounted to rotate inside their seats. Their thickness is substantially the same as that of the intermediate member 3, so that their side faces are in contact with the opposite faces of the sideplates 1 and 2. The clearance between the gearwheels and the sideplates in position is generally less than 20 microns and preferably between 2 and 20 microns.

Furthermore, the external diameter of the gearwheels 6 and 7 is substantially as great as the diameter of the seats 4 and 5. The diametral clearance between a gearwheel and its seat is generally less than 50 microns and it is preferably between 5 and 20 microns. The teeth of each gearwheel can thus come into contact, via their end, with the associated cylindrical side wall of the seat which guides each gearwheel in its rotational movement. Experience shows that this guiding is satisfactory when the side wall of the seat of a gearwheel encloses directly at least 80 percent of the total number of teeth of a gearwheel. Generally, it encloses directly from 80 to 90 percent of the teeth of a gearwheel.

One gearwheel is solid, and the other is formed with a recess 8 in its radially extending axial end face, the cross-section of the recess parallel to its plane face, being non-circular. This can be either a blind cavity, or an orifice which passes through the gearwheel from one side to the other, the cross-section of which is not a shape generated by revolution. The cruciform end 9 of a drive shaft 10 and intermediate pins 11 and 12 are located in the recess. When in place, the pins are located in cylindrical portions of the recess, at diagonally opposite points thereof, and are positioned between the arms of the cruciform end 9, so that the gear wheel 6 can be driven by the drive shaft 10.

The radial clearances along any two mutually perpendicular directions, between the gearwheels on the one hand and the end of the shaft and the pins on the other hand, are determined so that the gearwheel can take up any position inside its seat, taking the diametral clearance into account.

The pins play a part in transmitting, to the drive gearwheel, the rotational torque provided by the drive shaft, by distributing the forces better. By this means, given by way of an example, it is possible to avoid any rigid connection between the drive shaft and the drive gearwheel placed at its end.

The sideplate 2 is provided with an orifice 13 through which the shaft 10 passes. The diametral clearance between the orifice 13 and the shaft 10 is advantageously between 2 and 10 microns. The sideplate 1 is formed with inlet and outlet ports 14 and 15 for introducing and removing the pumped fluid; suitable pipelines (not shown) are connected to the ports 14 and 15. One or more side grooves 16 make it possible to centre the sideplates relative to the intermediate member, inside a suitable casing (not shown). The shaft 10 is firmly fixed to a motor via a suitable speed reduction gearbox or to any known drive means (not shown). The various components of the pump body are held together by any known means (not shown), for example, between two flanges connected by tie-rods. These flanges advantageously hold the connecting pipelines against the ports 14 and 15.

In operation, the fluid to be pumped enters, via the port 14, between the gearwheels 6 and 7; it is carried along by the teeth of these gearwheels to the periphery, until it reaches the port 15 through which it is removed.

A film of the conveyed fluid generally forms between the sidefaces of the gearwheels and the sidefaces 1 and 2 and can provide the necessary lubrication.

The pump according to the invention withstands high speeds: for example, it can revolve normally at 2,800 revolutions per minute.

Being constructed exclusively of ceramic material, it withstands considerable thermal shocks, for example, temperature variations of 100°C in less than 10 seconds. It also withstands temperatures which can be as high as several hundreds of degrees centigrade, for example 400°C.

Since it does not contain any joint or any leakproofing device around the drive shaft, it is self-priming and can suck up water under a reduced pressure greater than 700 millimetres of mercury at about ambient temperature.

The particular characteristics of this pump makes it possible to use it for many purposes, especially in the laboratory. Its volumetric characteristics make it possible to use it as a metering pump, even with liquids of low viscosities. By way of an example, it is very suitable for displacing a dialysis liquid in a dialysis bath generating device used for artificial kidneys, because it is self-priming and can be sterilised by means of heat, without disadvantage, between two consecutive operations.

We claim:

1. In a gear pump comprising two intermeshing cylindrical gear wheels located in two part cylindrical communicating seats of the body of the pump provided with inlet and outlet orifices for the fluid, and with an orifice for the passage of the drive shaft for driving the driven gear wheel, each of said orifices being located in an end wall of the body of the pump, the improvement which consists in that:
   a. the said body of the pump, the drive shaft, and the gear wheels are formed entirely of a ceramic material;
   b. the axial clearance between each gear wheel and its seat is less than 20 microns and the diametral clearance between each gear wheel and its seat is less than 50 microns;
   c. each gear wheel is mounted effective to be guided solely by the walls of its seating, which directly enclose at least 80 percent of the total number of gear teeth of the respective gear wheel; and
   d. the drive shaft engages freely and with play in a non-circular cross-section recess in an end face of the driven gear wheel and passes through the body of the pump through an orifice, the diametral clearance between the drive shaft, and the orifice being between 2 and 10 microns.

2. In a pump according to claim 1, the improvements which consist in that the pump body comprises two side plates and an intermediate gear pump member in direct contact with said side plates, the intermediate member having said part cylindrical surfaces extending through the entire thickness thereof, said two plates and intermediate member being assembled in fluid tight manner with the aid of mechanical clamping means.

* * * * *